UNITED STATES PATENT OFFICE.

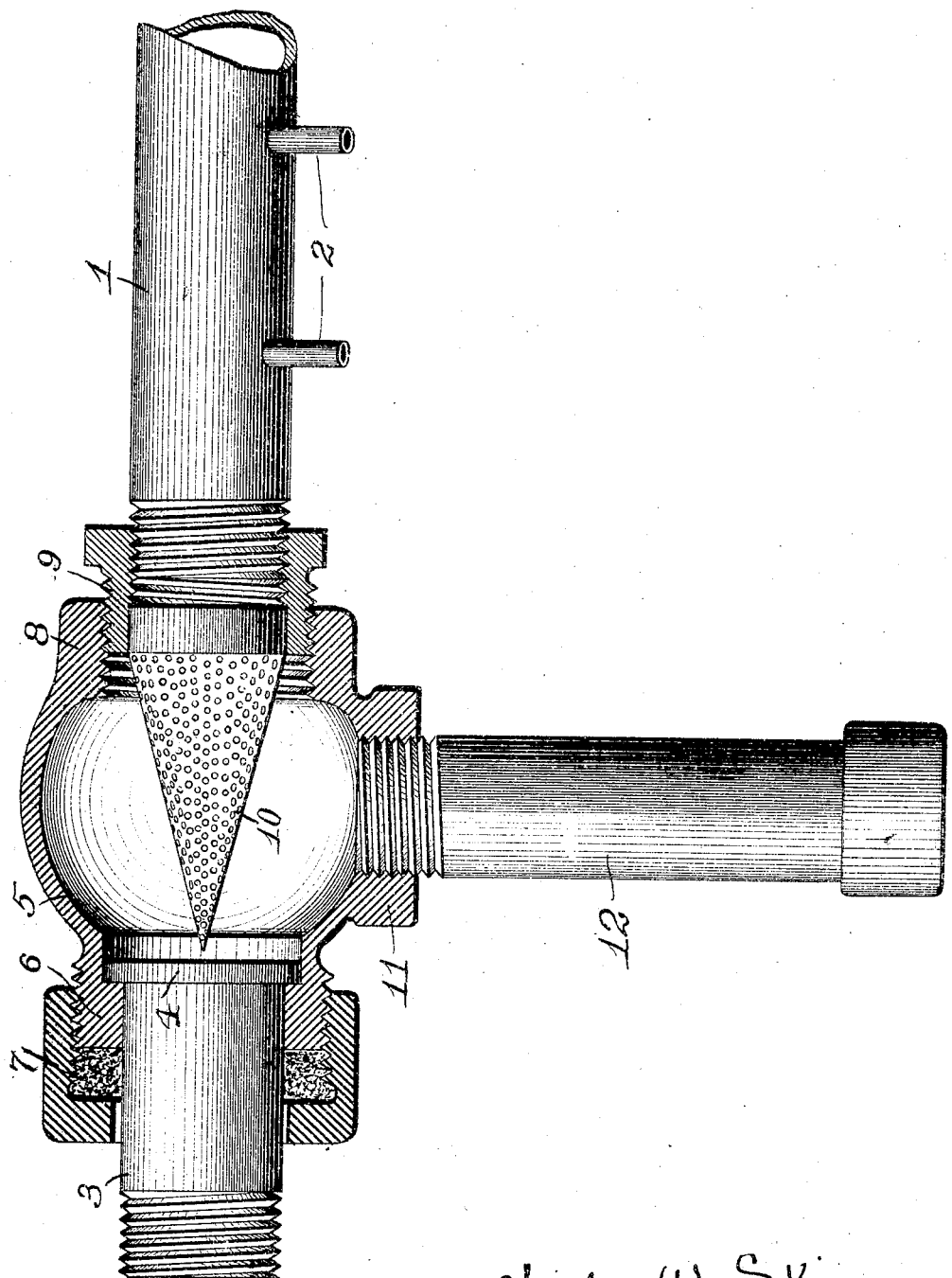

CHARLES W. SKINNER, OF TROY, OHIO.

SPRINKLING-PIPE CONNECTION.

No. 852,584.

Specification of Letters Patent.

Patented May 7, 1907.

Application filed December 28, 1906. Serial No. 349,769.

*To all whom it may concern:*

Be it known that I, CHARLES W. SKINNER, a citizen of the United States, residing in Troy, Miami county, Ohio, have invented certain new and useful Improvements in Sprinkler-Pipe Connections, of which the following is a specification.

In certain arrangements of sprinklers a pipe is provided with a longitudinal series of sprinkling nozzles and mounted for rotatory motion relative to a fixed supply pipe, and my present invention has to do with the details of construction of a rotatory connection device designed to facilitate the connection of the fixed and rotatory pipes and provide for turning the latter and for guarding the rotatory pipe against the admission of matter liable to clog the sprinkling nozzles.

The invention will be readily understood from the following description taken in connection with the accompanying drawing which is an axial section of my improved connection.

In the drawing:—1, indicates the rotatory sprinkler pipe: 2, typical nozzles projecting therefrom: 3, a sleeve disposed in the same axial line with pipe 1 and separated endwise from it and adapted for tight and rigid connection with the pipe which is to supply the sprinkler pipe with water: 4, a collar fast on that end of the sleeve 3 nearest the sprinkler pipe: 5, a rotatory tee-shaped chambered casting inclosing the general space between the contiguous ends of the sleeve and sprinkler pipe and having end openings for connection with them: 6, an exteriorly threaded nose projecting from that end of the tee which connects with the sleeve, this nose encircling the sleeve behind the collar thereon and taking a facial bearing against the rear face of the collar: 7, a packing nut screwed upon this threaded nose of the tee and serving to form the packed joint between the nose and the sleeve: 8, an interiorly threaded nose at that end of the tee which is to connect with the sprinkler pipe: 9, a bushing screwed tightly into this nose and having the sprinkler pipe screwed tightly into it: 10, a conical strainer disposed within the chamber of the tee and having its large end removably but snugly fitted within the bushing: 11, an interiorly threaded branch nose of the tee with its axis at right angles to the common axis of the sprinkler pipe and sleeve: and 12, a handle screwed tightly into the branch nose of the tee.

It is to be understood that sleeve 3, being rigidly connected with the pipe which is to supply the apparatus with water is rigid or non-rotary. The tee, and all the parts screwed to it, are capable of rotation relative to the sleeve and the packing insures a tight joint at the point of swiveling union. By giving angular motion to the handle the tee and the sprinkler pipe may be turned as desired to properly direct the streams from the nozzles. The strainer guards the nozzles from foreign matter. By removing the handle the chamber may be emptied of accumulated foreign matter and the strainer may be inspected. By unscrewing the bushing, first unscrewing the sprinkler pipe if desired, the bushing may be removed from the tee, bringing with it the strainer and permitting the strainer to be readily removed from the bushing. In assembling the parts the sleeve is put in place by being inserted through the interiorly threaded nose 8.

I claim:—

1. A sprinkler pipe connection comprising a rotatory chambered tee having a bored and exteriorly threaded nose at one end and having an interiorly threaded discharge-nose at the other end in line with the first-mentioned nose and having a threaded nose at right angles to the other noses, a sleeve swiveled within the first-mentioned nose, a packing nut engaging the first-mentioned nose and coöperating with the sleeve, a discharge pipe having connection at said discharge-nose, a conoidal strainer disposed within said chamber and having its larger end held at the juncture of the discharge pipe with the chamber, and a handle secured to the third nose of the tee to serve in rotating the tee, combined substantially as set forth.

2. A sprinkler pipe connection comprising a rotatory chambered tee having a bored and exteriorly threaded nose at one end and having an interiorly threaded discharge-nose at the other end in line with the first-mentioned nose and having a threaded nose at right angles to the other noses, a sleeve swiveled within the first-mentioned nose, a packing nut engaging the first-mentioned nose and coöperating with the sleeve, a bushing screwed into the interiorly threaded nose of the tee and adapted to have a pipe screwed into it, a conoidal strainer disposed within the chamber of the tee and having its larger end fitted removably in the bushing, and a handle secured to the third nose of the tee to serve in rotating the tee, combined substantially as set forth.

CHARLES W. SKINNER.

Witnesses:
R. B. MILLIKIN,
M. S. BELDEN.